(12) United States Patent
Alkhalifah et al.

(10) Patent No.: US 9,588,245 B2
(45) Date of Patent: Mar. 7, 2017

(54) EFFICIENT WAVEFIELD EXTRAPOLATION IN ANISOTROPIC MEDIA

(71) Applicant: King Abdullah University of Science and Technology (KAUST), Thuwal (SA)

(72) Inventors: Tariq Alkhalifah, Thuwal (SA); Xuxin Ma, Thuwal (SA); Umair bin Waheed, Thuwal (SA); Mohammad Akbar Hosain Zuberi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 537 days.

(21) Appl. No.: 14/138,882

(22) Filed: Dec. 23, 2013

(65) Prior Publication Data

US 2014/0188393 A1    Jul. 3, 2014

Related U.S. Application Data

(60) Provisional application No. 61/746,257, filed on Dec. 27, 2012.

(51) Int. Cl.
*G01V 1/00*   (2006.01)
*G01V 1/28*   (2006.01)
*G01V 1/30*   (2006.01)

(52) U.S. Cl.
CPC ........ *G01V 1/303* (2013.01); *G01V 2210/586* (2013.01); *G01V 2210/622* (2013.01); *G01V 2210/626* (2013.01); *G01V 2210/67* (2013.01)

(58) Field of Classification Search
CPC ...... G01V 1/28; G01V 1/282; G01V 2210/51; G01V 1/303; G01V 1/30; G01V 1/42;
(Continued)

(56) References Cited

U.S. PATENT DOCUMENTS

2005/0065731 A1*   3/2005   Mittet ............... G01V 1/28
                                                        702/13

OTHER PUBLICATIONS

Sava, Migration and Velocity Analysis by Wavefield Extrapolation, 2004, http://sepwww.stanford.edu/public/docs/sep118.*

(Continued)

*Primary Examiner* — Roy Y Yi
(74) *Attorney, Agent, or Firm* — Thomas | Horstemeyer LLP; Todd N. Deveau; Randy R. Schoen

(57) ABSTRACT

Various examples are provided for wavefield extrapolation in anisotropic media. In one example, among others, a method includes determining an effective isotropic velocity model and extrapolating an equivalent propagation of an anisotropic, poroelastic or viscoelastic wavefield. The effective isotropic velocity model can be based upon a kinematic geometrical representation of an anisotropic, poroelastic or viscoelastic wavefield. Extrapolating the equivalent propagation can use isotopic, acoustic or elastic operators based upon the determined effective isotropic velocity model. In another example, non-transitory computer readable medium stores an application that, when executed by processing circuitry, causes the processing circuitry to determine the effective isotropic velocity model and extrapolate the equivalent propagation of an anisotropic, poroelastic or viscoelastic wavefield. In another example, a system includes processing circuitry and an application configured to cause the system to determine the effective isotropic velocity model and extrapolate the equivalent propagation of an anisotropic, poroelastic or viscoelastic wavefield.

20 Claims, 4 Drawing Sheets

(58) Field of Classification Search
CPC .............. G01V 1/301; G01V 2210/67; G01V 2210/679; G01V 1/286; G01V 1/362; G01V 11/00; G01V 1/38; G01V 2210/57; G01V 2210/675
USPC ....... 702/14, 16, 18, 1, 11, 13, 17, 127, 156, 702/189, 7; 703/2, 10, 5, 6
See application file for complete search history.

(56) References Cited

OTHER PUBLICATIONS

Shragge, "Wave-Equation Migration in Generalized Coordinate Systems", Dissertation submitted to the Dept. of Geophysics and the Committee on Graduate Studies of Stanford University, Nov. 2009, Chapters 1 and 2.
Ma, et al., "Wavefield Extrapolation in Caustic-Free Normal Ray Coordinates", SEG Las Vegas Annual Meeting, Sep. 2012, pp. 1-5.
International Search Report and Written Opinion for PCT/IB2013/003193 mailed Jan. 30, 2015.

* cited by examiner

EFFICIENT WAVEFIELD EXTRAPOLATION IN ANISOTROPIC MEDIA

CROSS REFERENCE TO RELATED APPLICATIONS

This application claims the benefit of and priority to U.S. provisional application entitled "EFFICIENT WAVEFIELD EXTRAPOLATION IN ANISOTROPIC MEDIA" having Ser. No. 61/746,257, filed Dec. 27, 2012, the entirety of which is hereby incorporated by reference.

BACKGROUND

Wavefield extrapolation and simulation (and wave equation solutions in general) are used in seismic modeling, imaging, and inversion and they tend to consume 90% of the computational effort in the Oil and Gas exploration industry. The process is governed by the wave equation and uses knowledge of the medium elastic and anisotropic (including in some cases poroelastic) properties. Since seismic data are recorded using sensors distributed over a limited region (for example, the Earth's surface) of the domain of interest, wavefield extrapolation by solving the wave equation is needed, along with the medium properties. Recently, with high-resolution data, the industry has recognized that anisotropic behavior of wavefields is prevalent in seismic data. Thus, accurate simulation of wave propagation in the subsurface includes anisotropy in wave extrapolation. However, the cost of wavefield extrapolation in inhomogeneous anisotropic media exceeds that in isotropic inhomogeneous media. In fact, for a transversely isotropic media with a tilted axis of symmetry the cost could be five fold. Add to that, in the Gulf of Mexico about 70% of the reverse time migration applied there is, now, based on a tilted transversely isotropic media (TTI) description of the medium.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
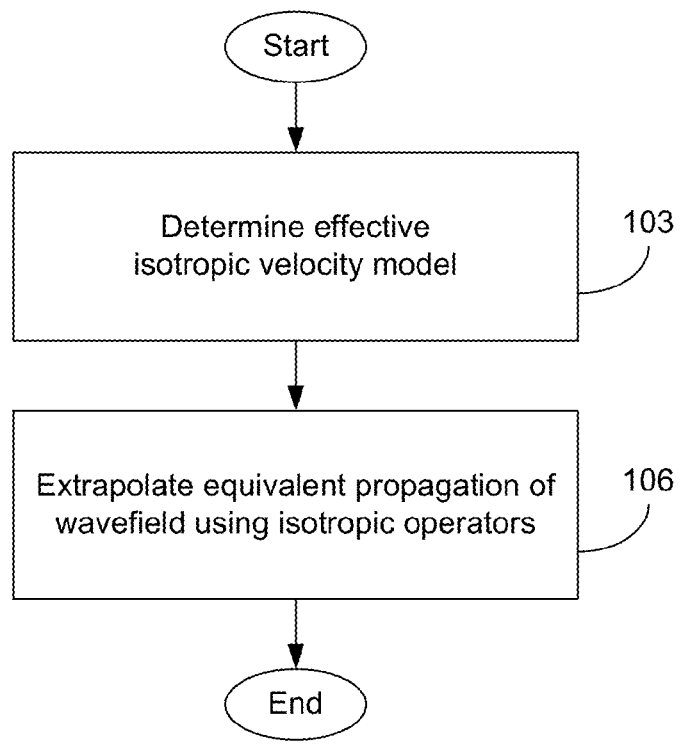
FIG. 1 is flowchart illustrating an example of wavefield extrapolation in accordance with various embodiments of the present disclosure.

Disclosed herein are various embodiments related to efficient wavefield extrapolation in anisotropic media. Reference will now be made in detail to the description of the embodiments as illustrated in the drawings, wherein like reference numbers indicate like parts throughout the several views.

Simulation of wave propagation for imaging of seismic data is computationally intensive because of the amount of data and the intensity of computational operations that are applied. Because the Earth is complex and anisotropic, extrapolation methods based on more complicated wave equations are used to simulate wave propagation. Wave propagation speed can change as a function of position and possibly the direction of propagation (anisotropy). The cost of extrapolating wavefields in anisotropic media can exceed that in isotropic media. Using the isotropic extrapolation equations to approximately solve for anisotropic effects can reduce the computational cost. This is especially true when the anisotropy exhibits a tilted (from the vertical) symmetry axis. The kinematics of the wavefield, which may be appropriately represented in the high-frequency asymptotic approximation by the eikonal equation, can be used to develop effective isotropic models. The developed models may then be used to efficiently extrapolate the propagation of anisotropic wavefields using isotropic operators that are relatively cheaper. These effective velocity models are source dependent and tend to embed the anisotropy influence in the inhomogeneity representation.

An effective source-dependent isotropic velocity model can be determined using the kinematic high-frequency geometrical representation of the anisotropic wavefield. The geometrical behavior is the wave front shape of the propagating wave. Matching (or mapping) the geometrical behavior of the anisotropic propagation to an isotropic version, a new velocity is created that may be referred to as the isotropic velocity. In anisotropic media, the wave propagation depends on a plurality of parameters that describe the speed change with direction. In some cases, velocity may be a function of five parameters that changes with position. The effective isotropic velocity model replaces these parameters by a single velocity that encompasses the same effect in the geometrical description. The effective isotropic velocity model is different for each source location. This effective velocity model is approximately equivalent to the instantaneous phase velocity estimated by matching the kinematics of an isotropic model to that of the anisotropic one along the wavefront. Matching the geometrical propagation behaviors may include a slope based fitting, a curvature based fitting, or a function or phase based fitting. As soon as an effective velocity model is constructed for a particular point source in an anisotropic medium, it may be used to solve the isotropic wave equation using this effective isotropic velocity model. Solving the wave equation includes wavefield extrapolating in inhomogeneous isotropic media.

A traveltime can be used to describe the phase behavior of the Green's function, a key tool for Kirchhoff modeling and migration. The traveltime for a fixed point source in a heterogeneous medium is governed by the eikonal equation. Considering an anisotropic (elastic or acoustic) inhomogeneous three-dimensional model, the traveltime map can be extracted by solving the corresponding eikonal equation. Such an equation may be expressed in a form of the Hamilton-Jacobi equation given by the following formula:

$$F(x, \tau, \delta\tau/\delta x) = 0 \qquad \text{EQN (1)}$$

where x describes a location in the domain of investigation, D, $\tau$ is the traveltime map, and $p_i = \delta\tau/\delta x_i$ are the components of the slowness vector $(\delta\tau/\delta x)$.

Setting the Hamiltonian F to zero describes the geometry of surfaces or level sets representing the propagation of singularities (or wavefronts) in solving the wave equation as an evolution in time. In its general form, it may also represent the wavefront surfaces (in stationary time) corresponding to an anisotropic, poroelastic and/or viscoelastic medium in any coordinate system with any initial/boundary surface or source. Solving EQN. (1) for such level sets (or traveltime surfaces) is accomplished using many of the available finite-difference methods or by extrapolating the solution along it's characteristics using ray-tracing methods. Using the isotropic eikonal equation, an effective velocity for a particular traveltime solution corresponding to a more complicated medium is computed as follows:

$$v_{eff}(x)=1/|\delta\tau/\delta x| \qquad \text{EQN (2)}$$

where $|\cdot|$ is the Euclidean norm.

A similar approach may be used to obtain an effective shear wave velocity by matching the kinematics of shear waves of the isotropic model with the anisotropic model.

The effective velocity can include the influence of anisotropy, density, poroelastic behavior, or/and the viscoelastic phenomena. In all cases the effective P-wave or Shear wave velocity or both with or without density can be used in an isotropic acoustic/elastic wave equation to solve for an approximate wavefield as follows:

$$\Im[v_{eff}(x)]u(x,t)=f(x,t) \qquad \text{EQN (3)}$$

where $\Im[v_{eff}(x)]$ is the isotropic acoustic or elastic wave equation operator corresponding to a velocity or velocities given by the effective velocity/velocities (in the case of having shear waves). For acoustic media, such an operator is given by:

$$\Im[v_{eff}(x)]=\nabla^2+(1/v_{eff}(x))(\delta^2/\delta t^2) \qquad \text{EQN (4)}$$

Despite the kinematic only matching between both wavefields, the wavefield extrapolation will include most of the wavefield components, including the frequency dependency of wavefields and any caustics. For an input isotropic acoustic media, the effective velocity reduces to the true velocity and the wavefield solution is that of the isotropic case.

Referring to FIG. 1, shown is flowchart illustrating an example of wavefield extrapolation in accordance with various embodiments of the present disclosure. Beginning with 103, an effective isotropic velocity model is determined. Referring back to EQN (1), provided is a general description of the traveltime map τ that is matched. There are two different equations for F, a first for isotropic and a second for anisotropic. Solve for τ using the anisotropic equation for F. The solution for τ is then used in EQN (2) to determine the effective isotropic velocity model for a specific source as a function of position. In 106, the effective isotropic velocity model may be used to extrapolate an equivalent propagation of a wavefield through the anisotropic media using isotropic operators.

In some implementations, an effective isotropic wavefield can be extrapolated. The extrapolation process may include all type of solutions to the isotropic wave equation, including analytical, using the effective velocity model. In some cases, an effective isotropic elastic wavefield may be extrapolated. Such an effective velocity model can be for P-waves or S-waves in the elastic case, where the same density or a constant density or no density is used as density does not affect travel times in the high frequency asymptotic approximation. In other implementations, an effective anisotropic wavefield can be extrapolated. Such an effective velocity may correspond to an elliptical or anisotropic model in which any or all of the elastic coefficients or anisotropic parameters are computed using the effective model computation of EQNS (1) and variations to EQN (2) valid for anisotropy media.

Figure 2A:
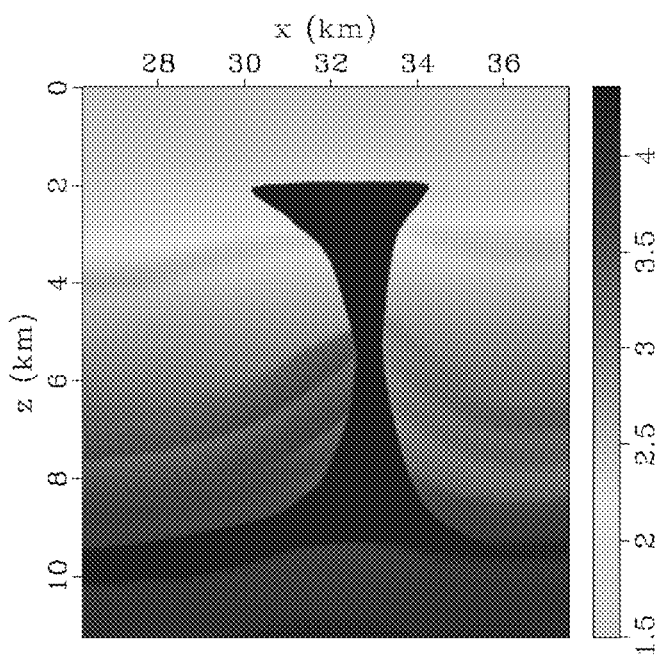
FIGS. 2A, 2B, and 2C are plots illustrating effective modeling based upon wavefield extrapolation of FIG. 1 in accordance with various embodiments of the present disclosure.
Figure 2B:
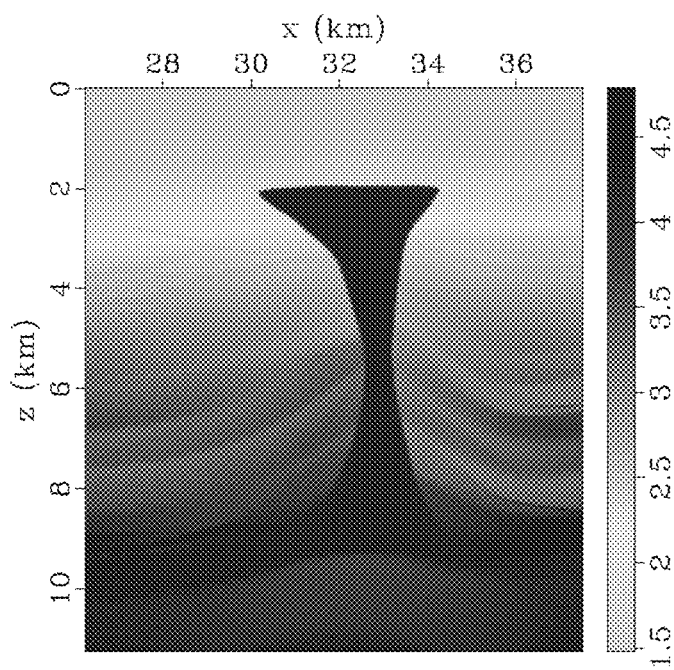
Figure 2C:
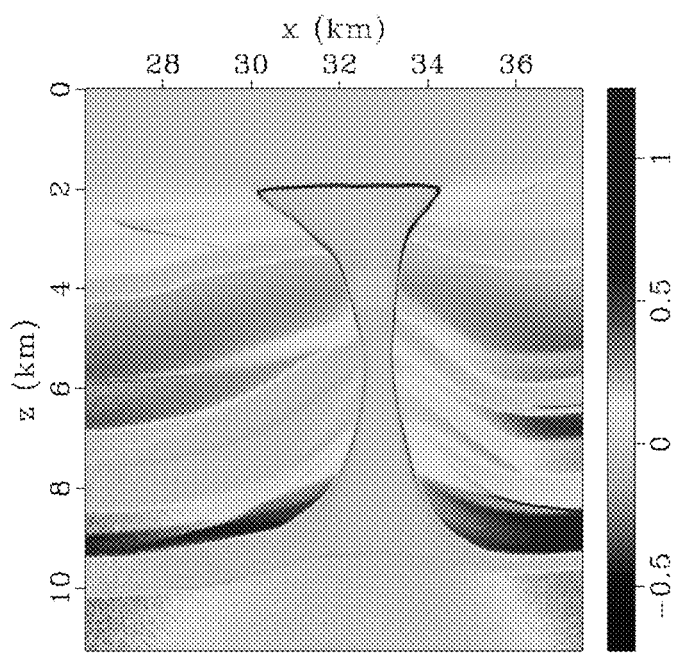

The approach was tested by comparing an equivalent solution to the exact solution obtained using the more expensive conventional method. Part of a transversely isotropic (TI) BP model is given by a complex salt body in the center as shown in FIG. 2A. Using the TI model, including the δ, ε, and θ models, the traveltime map τ was solved for a source located at depth of 4 km and lateral position of 32.75 km using a fast marching method applied to the finite difference approximation of the acoustic eikonal equation for TI media. The resulting traveltime map τ was used to compute an effective isotropic velocity model using EQN (2) that is displayed in FIG. 2B. The difference between the effective isotropic velocity model for the BP model of FIG. 2A and the computed effective velocity model of FIG. 2B is shown in FIG. 2C. This difference is related to the anisotropy and is source location dependent.

Figure 3A:
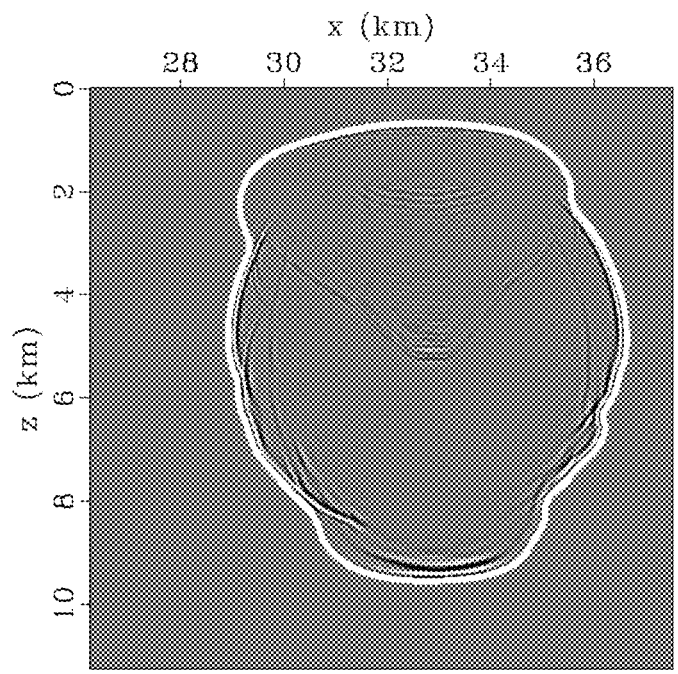
FIGS. 3A, 3B, and 3C are plots illustrating equivalent propagation based upon wavefield extrapolation of FIG. 1 in accordance with various embodiments of the present disclosure.
Figure 3B:
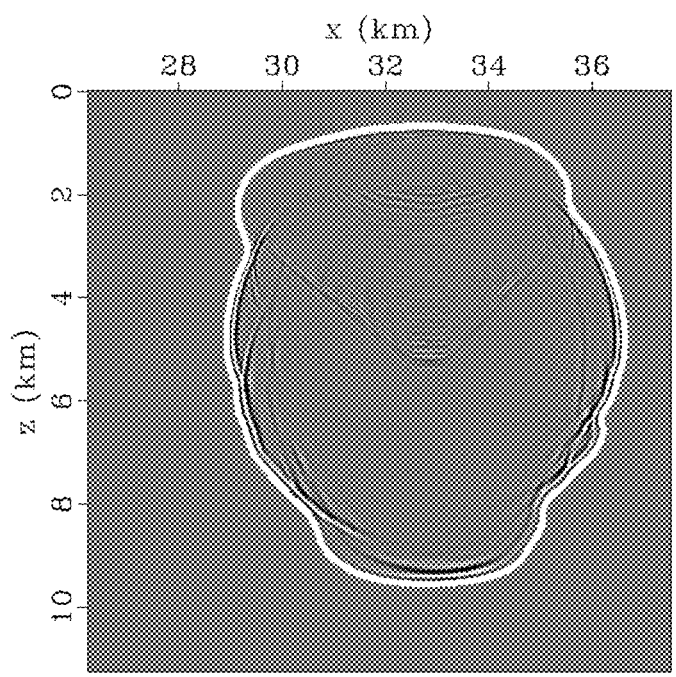
Figure 3C:
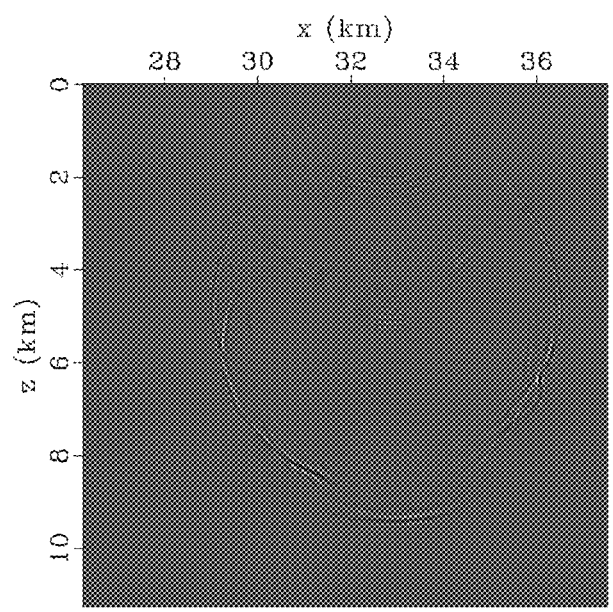

For the same TI model and source location, a finite difference method was applied to an acoustic TI wave equation to obtain a snap shot of a propagating wavefield shown in FIG. 3A. The grid spacing in both directions is 25 m. The extrapolation time step is 0.8 msec and the peak frequency is 20 Hz. The exact finite-difference eikonal solution was overlayed on the snap shot of the propagating wavefield at 1.28 s. Using the computed effective isotropic velocity model of FIG. 2B, the acoustic isotropic wave EQN (4) was solved using a finite difference approach. The acoustic isotropic wave equation was used to solve for an equivalent wavefield for the same source to obtain the snap shot shown in FIG. 3B. The difference between the two wavefields at 1.28 s is plotted at the same scale in FIG. 3C. As can be seen, the difference is relatively small even considering the use of the cheaper isotropic acoustic wave equation. The cost of computing the equivalent wavefield shown in FIG. 3B is half of that of the wavefield shown in FIG. 3A. For a 3D extrapolation case, the difference is at least four fold.

Figure 4:
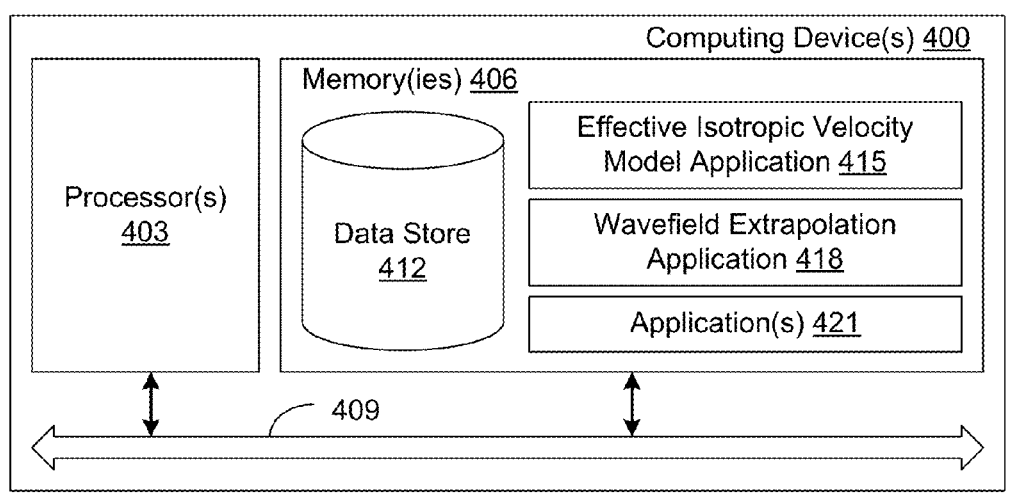
FIG. 4 is a schematic block diagram of a computing device in accordance with various embodiments of the present disclosure.

With reference to FIG. 4, shown is a schematic block diagram of a computing device 400 according to various embodiments of the present disclosure. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 may be an effective isotropic velocity model application 415, a wavefield extrapolation application 418, and/or other applications 421. In some implementations, the effective isotropic velocity model application 415 and wavefield extrapolation application 418 may be combined into a common application. Also stored in the memory 406 may be a data store 412 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the effective isotropic velocity model application 415, the wavefield extrapolation application 418, application(s) 421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowchart of FIG. 1 shows a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fractional order impedance matching application 415, the fractional order Smith chart application 418, and/or application(s) 421, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for wavefield extrapolation, comprising:
   determining, in a computing device, an effective isotropic velocity model based upon a kinematic geometrical representation of an anisotropic, poroelastic or viscoelastic wavefield;
   extrapolating, in the computing device, an equivalent propagation of an anisotropic, poroelastic or viscoelastic wavefield using isotopic, acoustic or elastic operators based upon the effective isotropic velocity model; and
   providing the equivalent propagation of the anisotropic, poroelastic or viscoelastic wavefield for display.

2. The method of claim 1, wherein the effective isotropic velocity model is determined based at least in part upon matching a geometrical propagation behavior of the anisotropic wavefield to a geometrical propagation behavior of the effective isotropic velocity model.

3. The method of claim 2, wherein matching the geometrical propagation behaviors includes a slope based fitting, a curvature based fitting, or a function or phase based fitting.

4. The method of claim 2, wherein determining the effective isotropic velocity model comprises:
   determining a traveltime map ($\tau$) of the anisotropic wavefield based upon a corresponding eikonal equation $F(x, \tau, \delta\tau/\delta x))=0$; and
   determining the effective isotropic velocity model ($v_{eff}(x)$) based upon $v_{eff}(x)=1/|\delta\tau/\delta x|$ where $|\cdot|$ is a Euclidean norm.

5. The method of claim 4, wherein an effective isotropic wavefield is extrapolated.

6. The method of claim 5, wherein extrapolating the equivalent propagation includes determining a solution to an isotropic wave equation based at least in part upon the effective isotropic velocity model.

7. The method of claim 6, wherein extrapolating the equivalent propagation includes determining an analytical solution to the isotropic wave equation.

8. The method of claim 5, wherein an effective isotropic elastic wavefield is extrapolated.

9. The method of claim 4, wherein an effective anisotropic model is determined using the corresponding eikonal equation.

10. The method of claim 4, wherein an effective anisotropic wavefield is extrapolated.

11. A non-transitory computer readable medium storing an application for wavefield extrapolation that, when executed by processing circuitry, causes the processing circuitry to:
    determine an effective isotropic velocity model based upon a kinematic geometrical representation of an anisotropic, poroelastic or viscoelastic wavefield;
    extrapolate an equivalent propagation of an anisotropic, poroelastic or viscoelastic wavefield using isotopic, acoustic or elastic operators based upon the effective isotropic velocity model; and
    provide the equivalent propagation of the anisotropic, poroelastic or viscoelastic wavefield for display.

12. The non-transitory computer readable medium of claim 11, wherein the effective isotropic velocity model is determined based at least in part upon matching a geometrical propagation behavior of the anisotropic wavefield to a geometrical propagation behavior of the effective isotropic velocity model.

13. The non-transitory computer readable medium of claim 12, wherein determining the effective isotropic velocity model comprises:
    determining a traveltime map ($\tau$) of the anisotropic wavefield based upon a corresponding eikonal equation $F(x, \tau, \delta\tau/\delta x))=0$; and
    determining the effective isotropic velocity model ($v_{eff}(x)$) based upon $v_{eff}(x)=1/|\delta\tau/\delta x|$ where $|\cdot|$ is a Euclidean norm.

14. The non-transitory computer readable medium of claim 13, wherein an effective isotropic wavefield is extrapolated.

15. The non-transitory computer readable medium of claim 14, wherein an effective isotropic elastic wavefield is extrapolated.

16. The non-transitory computer readable medium of claim 11, wherein extrapolating the equivalent propagation includes determining a solution to an isotropic wave equation based at least in part upon the effective isotropic velocity model.

17. The non-transitory computer readable medium of claim 16, wherein extrapolating the equivalent propagation includes determining an analytical solution to the isotropic wave equation.

18. A system for wavefield extrapolation, comprising:
    processing circuitry including a processor and memory; and
    an application stored in memory and executable by the processing circuitry, the application configured to cause the system to:
       determine an effective isotropic velocity model based upon a kinematic geometrical representation of an anisotropic, poroelastic or viscoelastic wavefield;
       extrapolate an equivalent propagation of an anisotropic, poroelastic or viscoelastic wavefield using isotopic, acoustic or elastic operators based upon the effective isotropic velocity model; and
       provide the equivalent propagation of the anisotropic, poroelastic or viscoelastic wavefield for display.

19. The system of claim 18, wherein the effective isotropic velocity model is determined based at least in part upon matching a geometrical propagation behavior of the anisotropic wavefield to a geometrical propagation behavior of the effective isotropic velocity model.

20. The system of claim 19, wherein extrapolating the equivalent propagation includes determining a solution to an isotropic wave equation based at least in part upon the effective isotropic velocity model.

* * * * *